UNITED STATES PATENT OFFICE.

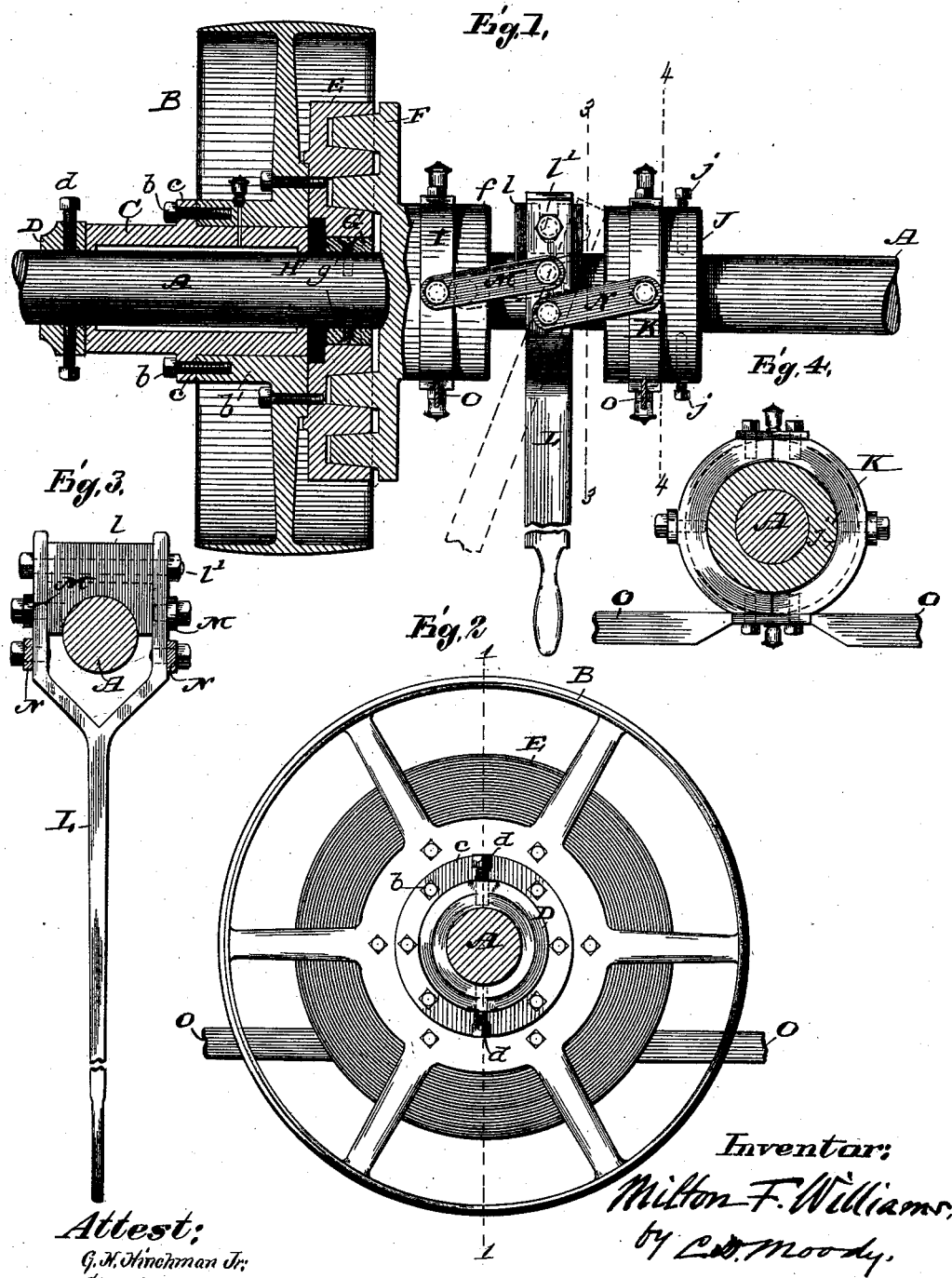

MILTON F. WILLIAMS, OF ST. LOUIS, MISSOURI.

CLUTCH-PULLEY.

SPECIFICATION forming part of Letters Patent No. 393,682, dated November 27, 1888.

Application filed June 12, 1888. Serial No. 276,872. (No model.)

*To all whom it may concern:*

Be it known that I, MILTON F. WILLIAMS, of St. Louis, Missouri, have made a new and useful Improvement in Clutch - Pulleys, of which the following is a full, clear, and exact description.

This improvement is adaptable not only to pulleys but to other analogous constructions—such as drums and gear-wheels—which are applied to shafts, and a portion of the improvement can be used in connecting and disconnecting shafts.

It consists substantially as hereinafter set forth and claimed, aided by a reference to the annexed drawings, making part of this specification, in which—

Figure 1 is a sectional elevation of the improved construction, the sectional portion being on the line 1 1 of Fig. 2, which in turn is an end view of the construction shown in Fig. 1, looking toward the right; Fig. 3, a section on the line 3 3 of Fig. 1; and Fig. 4, a section on the line 4 4 of Fig. 1.

The same letters of reference denote the same parts.

A represents the shaft which supports the other parts of the herein-described device, and B represents the pulley which is to be connected with the shaft. The pulley may be attached directly to the shaft, but partly to obtain a longer bearing upon the shaft than the average pulley affords, partly to be able to readily renew that portion of the pulley which comes in immediate contact with the shaft and which wears more rapidly than the outer portions of the pulley, and partly to enable such inner portions to be made at times of a different metal—say of brass—from that of the outer portion of the pulley. The pulley is preferably not fitted directly to the shaft, but is detachably fastened to a bushing, C, which in turn is applied to the shaft, as shown. The bushing is preferably elongated, as shown, and the preferable mode of uniting the bushing and pulley, so that they can be rotated as one part, is passing the screw-bolts b through the bushing-flange c into the pulley-hub b', as shown. The bushing may be in two semicircular parts. The pulley otherwise is of a familiar construction.

D represents a collar fixed by means of the set-screws d upon the shaft and serving as an abutment to sustain the pulley and the parts therewith united against the thrust of the movable clutch part.

E F respectively represent the clutch parts. The fixed clutch part E is adapted to be (removably) united centrally to the pulley by means of the screw-bolts shown. To prevent any accidental displacement of the pulley to the right, as viewed in Fig. 1, a collar, G, by means of its screws g, is preferably fixed to the shaft A, as shown. This collar may extend upon the shaft to meet the bushing C; but a packing, H, is preferably interposed to arrest in that direction the waste of any lubricant which may be applied to the shaft within the bushing. The movable clutch part F is extended to the right, Fig. 1, to form a hub, f. The hub is grooved to receive the encircling loose ring I, as shown. The clutch part, by means of a customary spline, (not shown,) can be slipped longitudinally upon but to be rotated with the shaft A.

J represents a collar adapted by means of the screws j, Fig. 1, to be fixed upon the shaft A. It constitutes the abutment to sustain in that direction the thrust of the clutch mechanism. It is grooved similarly to the hub f, and, as shown at j', Fig. 4, to receive the encircling loose ring K.

L, Figs. 1 and 3, represents a lever suspended by means of the saddle-block l from the shaft A. The bolt l', which passes through the forks of the lever and through the saddle-block, forms a pivot upon which the lever may turn as it is manipulated to operate the clutch, leaving the saddle-block free to remain upright upon the shaft.

By means of the links M N (there is a pair of these links at each side of the shaft) the lever is jointed, as shown, to the rings I K, respectively.

The operation is as follows: In Fig. 1 the parts are supposed to be arranged as when the movable clutch part is in engagement with the fixed clutch part, and the shaft, the clutch, the pulley, the bushing, and the fixed collars are rotatable together, and when those parts rotate, the hub f and the collar J turn in the rings I K, respectively. When it is desired to loosen the pulley, the lever L is turned on its pivot to the left, as indicated by the broken lines, Fig. 1, which movement, transmitted through the links M N and the parts therewith connected, as described, causes the movable clutch part to be drawn to the right sufficiently to cease to bear upon the fixed clutch part, and the pulley, fixed clutch part, and bushing are loosened upon the shaft. The braces O, Figs. 1, 2, and 4, which at one end are attached to the ring I and at the other end to some fixture, (not shown,) serve to prevent the ring from being carried around with the hub $f$. Similar braces, O, hold the ring K from being carried around with the collar J.

It will be seen that the efficiency of the device as a friction-clutch is greatly increased by each clutch part having a series of concentric circular projections and grooves alternately arranged and having the projections of each clutch part engage in the corresponding grooves of the other clutch part, as shown.

I claim—

1. The combination of the shaft, the grooved fixed collar, the movable grooved clutch part F, the rings K I, encircling loosely the said collar and the hub of the clutch part, respectively, the braces O, the lever L, suspended and pivoted as described, and the links M N, substantially as described.

2. The combination of the shaft A, the fixed collars, the pulley and bushing, the clutch parts, as described, the rings, the braces O, the links M N, and the lever suspended and pivoted substantially as described.

Witness my hand this 2d day of June, 1888.

MILTON F. WILLIAMS.

Witnesses:
C. D. MOODY,
R. J. DELANO.